US008064679B2

(12) United States Patent
Griffin (10) Patent No.: US 8,064,679 B2
(45) Date of Patent: Nov. 22, 2011

(54) TARGETED EDGE DETECTION METHOD AND APPARATUS FOR CYTOLOGICAL IMAGE PROCESSING APPLICATIONS

(75) Inventor: Christopher Griffin, Wilton, NH (US)

(73) Assignee: Cytyc Corporation, Marlborough, MA (US)

(*) Notice: Subject to any disclaimer, the term of this patent is extended or adjusted under 35 U.S.C. 154(b) by 522 days.

(21) Appl. No.: 12/332,562

(22) Filed: Dec. 11, 2008

(65) Prior Publication Data

US 2009/0169090 A1    Jul. 2, 2009

Related U.S. Application Data

(60) Provisional application No. 61/017,164, filed on Dec. 27, 2007.

(51) Int. Cl.
*G06K 9/00* (2006.01)
(52) U.S. Cl. ......................................... 382/133; 382/128
(58) Field of Classification Search .................. None
See application file for complete search history.

(56) References Cited

U.S. PATENT DOCUMENTS

| 5,016,173 | A  | * | 5/1991  | Kenet et al. ................... 382/128 |
| 7,218,775 | B2 | * | 5/2007  | Kokko et al. .................. 382/156 |
| 7,450,762 | B2 | * | 11/2008 | Morell .......................... 382/199 |
| 7,457,446 | B2 | * | 11/2008 | Soenksen ...................... 382/128 |

* cited by examiner

*Primary Examiner* — Vinh Nguyen
(74) *Attorney, Agent, or Firm* — Vista IP Law Group LLP (57) ABSTRACT

Edges in cytological image data are identified by obtaining a digital image of a specimen and computing a gradient image from the obtained digital image. A scaling function is applied to the grayscale image to identify regions of interest (e.g., edges of cell nuclei) in the digital image. Edges of the regions of interest are then identified based on the product of the computed gradient image and the scaling image. The scaling function may be applied to each image frame and one or more scaling thresholds are established for each frame to selectively pass, suppress, or scale pixels based on their measured intensity values. The scaled image resulting from application of the scaling function is multiplied with the gradient image to produce a targeted gradient image that identifies the edges of the region of interest. The targeted gradient image isolates edges corresponding to particular cellular structures, while rejecting other edges within the image.

20 Claims, 12 Drawing Sheets

TARGETED EDGE DETECTION METHOD AND APPARATUS FOR CYTOLOGICAL IMAGE PROCESSING APPLICATIONS

RELATED APPLICATION DATA

The present application claims the benefit under 35 U.S.C. §119 to U.S. provisional patent application Ser. No. 61/017,164, filed Dec. 27, 2007. The foregoing application is hereby incorporated by reference into the present application in its entirety.

FIELD OF THE INVENTION

The field of the invention generally relates to the field of cytology and histology. More specifically, the field of the invention relates to image processing methods used to identify edges of cellular features that are used in image segmentation. The field of the invention also relates to image processing methods for extracting one or more features obtained from cytological images for the purposes of classifying cells as diseased or non-diseased.

BACKGROUND OF THE INVENTION

In the medical industry, there is often a need for a laboratory technician, e.g., a cytotechnologist, to review a cytological specimen for the presence of specified cell types. For example, there is presently a need to review a cervico-vaginal Papanicolaou (Pap) smear slides for the presence of malignant or pre-malignant cells. Since its introduction over fifty years ago, Pap smears have been a powerful tool for detecting cancerous and precancerous cervical lesions. During that time, the Pap smear has been credited with reducing mortality from cervical cancer by as much as 70%. This once precipitous drop in the death rate has slowed however, and the mortality rate in the United States for this preventable disease has remained virtually constant, at about 5,000 per year since the mid-eighties. Therefore, about one-third of the 15,000 women diagnosed with cervical cancer annually still die, because the cancer was detected too late. A further cause for concern is National Cancer Institute data that shows an annual 3% increase in the incidence of invasive cervical cancer in white women under 50 years of age since 1986.

A number of factors may be contributing to this current threshold, not the least of which is the fact that many women, particularly in high risk populations, are still not participating in routine cervical cancer screening. Another contributing factor that has received much attention is the limitation of the traditional Pap smear method itself. The reliability and efficacy of a cervical screening method is measured by its ability to diagnose precancerous lesions (sensitivity) while at the same time avoiding false positive diagnosis (specificity). In turn, these criteria are dependent on the accuracy of the cytological interpretation. The conventional Pap smear has false negative rates ranging from 10-50%. This is due in large part to the vast number of cells and objects (typically as many as 100,000 to 200,000) that must be reviewed by a technician to determine the possible existence of a small number of malignant or pre-malignant cells. Thus, Pap smear tests, as well as other tests requiring detailed review of biological material, have suffered from a high false negative rate due to fatigue imposed on the technician.

To facilitate this review process, automated systems have been developed by various companies to focus the technician's attention on the most pertinent cells, with a potential to discard the remaining cells from further review. A typical automated system includes an imager and an automated optical microscope. Briefly, the imager can be operated to provide a series of numerous images of a cytological specimen slide, referred to as image frames, each depicting a different portion of the slide. The imager then processes these image frames to determine the most pertinent biological objects or regions of interest for review on the slide, and their locations (x-y coordinates) on the slide. For example, a region of interest may include a cellular organelle or cell structure such as a stained cell nucleus. This information is then passed on to the microscope, which, based on the x-y coordinates received from the imager, automatically or semi-automatically displays the biological objects for review by the technician.

In the process of determining the most pertinent biological objects, the automated system must perform segmentation and feature extraction on all cells present within each frame. Image segmentation involves a process of creating a digital representation of all the pixels in an image that represent a particular structure, such as, for instance, a cell nucleus. In order to perform image segmentation, there is a need to identify the boundaries or edges between various organelles or structures located within the cytological image data. For instance, image segmentation of the nucleus first requires the identification of the edges or boundary between the nucleus and the cell cytoplasm. Similarly, image segmentation of the whole cells requires establishing the edge or boundary between the cell cytoplasm and the background. Feature extraction involves the measurement of one or more parameters about a particular organelle or cellular structure. Certain classes of image features require that one identify the edges or boundaries between the various cellular components (e.g., cytoplasm, nucleus, nucleoli, etc.). In the case of applications to Pap smear images, the optical density of the cell nucleus or the nucleus-to-cytoplasm ratio may be used to identify potential diseased states of the tissue.

The spatial gradient is a useful measure of edges in image data, and within the field of cytological image processing, the spatial gradient can be used for both segmentation and feature extraction. However, in the case of segmentation, the spatial gradient is of limited use because the gradient captures edges corresponding to borders or edges between the nuclear material and the cytoplasm as well as the border formed between the cytoplasm and the background. Because cytoplasm edges may be present, the gradient information must be used cautiously, if at all, by segmentation algorithms because the cytoplasm edge is often much stronger or more dominant than nuclear edges, and thus can lead to over-segmentation of the cell nucleus.

SUMMARY OF THE INVENTION

In a first aspect of the invention, a method of identifying edges of cellular structures contained in cytological image data includes obtaining an intensity image of a specimen and computing a gradient image from the obtained intensity image. The intensity image may be smoothed by applying a Gaussian smoothing kernel. A piecewise linear scaling function is applied to the smoothed intensity image to generate a scaling image identifying regions of interest. Edges of cellular structures within the regions of interest are then identified based on the product of the scaling image and the gradient image. In one aspect of the method, the scaling function is applied to each image frame and one or more scaling thresholds are established for each frame to selectively pass, suppress, or scale pixels based on their measured intensity values. The scaled image and the gradient image are multiplied to produce a targeted gradient image that identifies the edges of the targeted cellular structures contained in the specimen. Edges of non-targeted cellular structures are suppressed.

In a second aspect of the invention, a method of identifying target edges contained in cytological image data includes obtaining a digital image of a specimen, the digital image comprising a plurality of frames, each frame comprising pixels having varying intensity values. A scaling function is applied to the pixels in each frame to obtain a scaled image. The scaling function includes one or more pixel intensity ranges for retaining, suppressing, or applying a substantially linear transformation of pixel intensity based on the pixel values obtained from the digital image. The scaled image is then multiplied with the spatial gradient image. The resulting image identifies the target edges contained in the cytological image and rejects or suppresses the edges which are not of interest. The edges may include, for instance, nucleus edges or cytoplasm edges.

In another aspect of the invention, a system for generating cytological image data that identifies target edges of a cellular feature contained therein includes an imaging station configured to obtain an image of a cytological specimen, the image comprising a plurality of image frames. The system further includes one or more image processors configured to calculate a Gradient Image of an image frame, the one or more image processors further being configured to generate a Scaling Image of the image frame, the Scaling Image being formed by application of a Scaling Function to each pixel in the frame, the one or more image processors being configured to generate a Targeted Gradient Image based at least in part on the Gradient Image and the Scaling Image, the Targeted Gradient Image comprising cytological image data including the edge of the targeted cellular feature.

BRIEF DESCRIPTION OF THE DRAWINGS

The drawings illustrate the design and utility of embodiment(s) of the invention, in which similar elements are referred to by common reference numerals. In order to better appreciate the advantages and objects of the invention, reference should be made to the accompanying drawings that illustrate the preferred embodiment(s). The drawings, however, depict the embodiment(s) of the invention, and should not be taken as limiting its scope. With this caveat, the embodiment(s) of the invention will be described and explained with additional specificity and detail through the use of the accompanying drawings in which.

DETAILED DESCRIPTION OF THE ILLUSTRATED EMBODIMENTS

Figure 1:
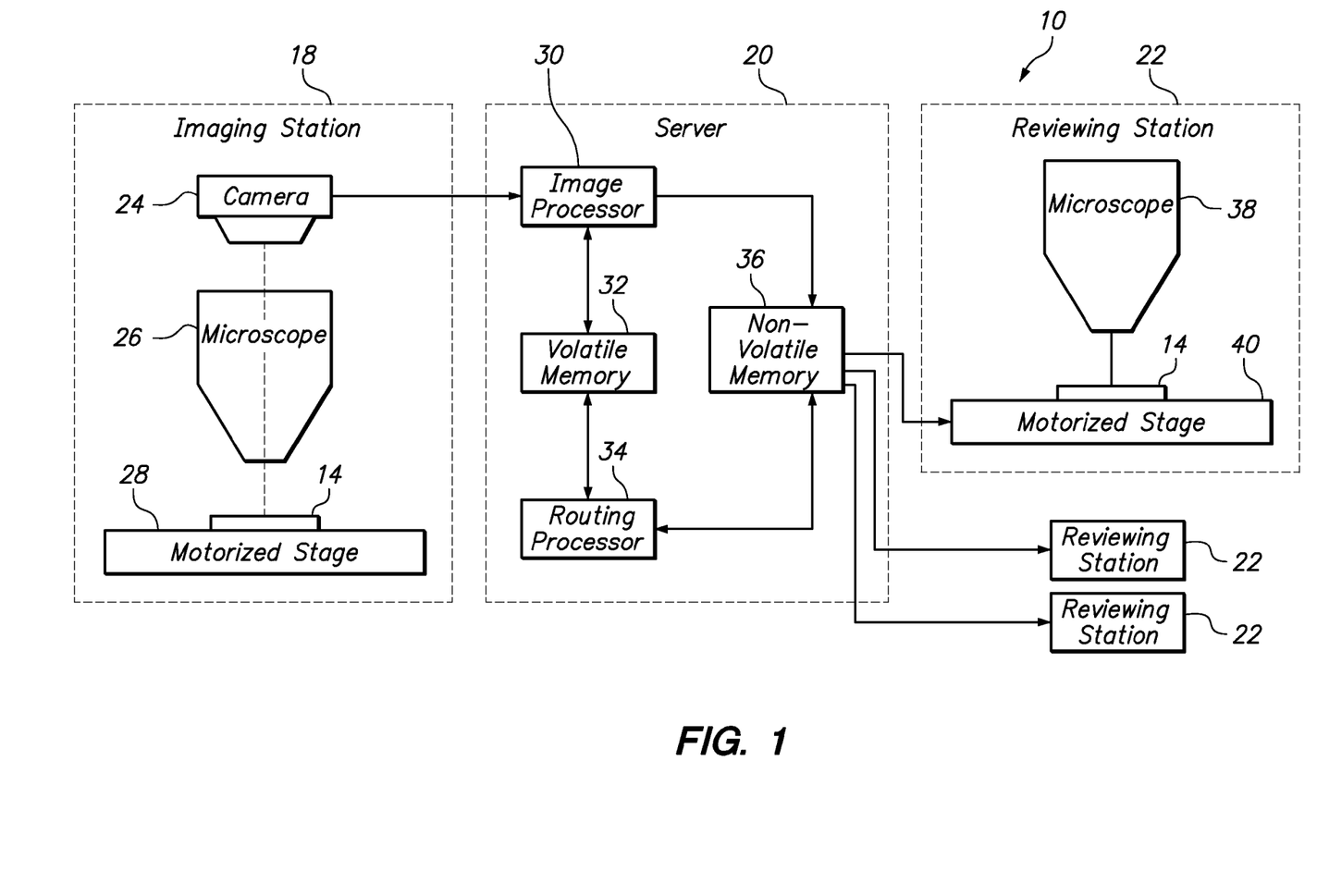
FIG. 1 illustrates a schematic representation of a biological screen system according to one embodiment.
Figure 2:
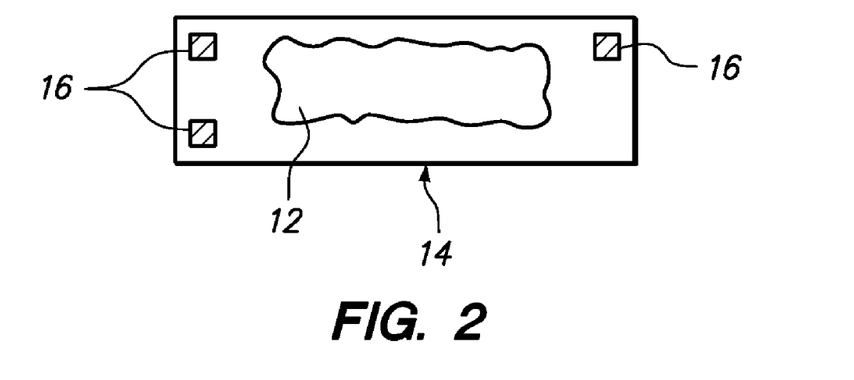
FIG. 2 is a schematic representation of a slide containing a biological specimen.

FIG. 1 illustrates a biological screening system 10 constructed in accordance with one preferred embodiment of the present invention. The system 10 is configured for presenting a biological specimen 12 located on a microscope slide 14 (as shown in FIG. 2) to a technician, such as a cytotechnologist, who can then review regions of interest located in the biological specimen 12. The regions of interest may be arranged in a number of fields of interest that cover portions of the slide 14, so that the cytotechnologist's attention can be subsequently focused on regions of interest within the fields of interest, rather than slide regions that are not pertinent. The slide 14 is provided with fiducial marks 16, the function of which will be described in further detail below. The system 10 may also be configured to automatically score or identify one or more regions of interest or even fields of interest located on a particular slide 14. For example, the system 10 may identify various organelles or cell structures located within the slide 14 using an image segmentation algorithm. Once image segmentation is complete, the system 10 may flag or identify those regions of interest that are indicative of a diseased state.

For example, the system 10 may highlight, flag, or report those regions of interest where the optical density of cellular nuclei or the nucleus-to-cytoplasm ratio indicate the presence of a diseased state. This information, along with the identified regions of interest may be presented to the cytotechnologist or stored for later review and/or confirmation.

Although the system 10 can be used to present any biological specimen (or even a non-biological specimen, such as a computer chip) that requires further review, the system 10 lends itself particularly well to the presentation of cytological cervical or vaginal cellular material, such as that typically found on a Pap smear slide. In this case, the regions of interest take the form of individual cells and cell clusters that are reviewed to check for the possible presence of an abnormal condition, such as malignancy or pre-malignancy. The regions of interest may also include the individual cellular organelles or cell structures located within an individual cell or group of cells. For example, the region of interest may include cellular nuclei or the borders formed between cell walls and the background.

Typically, the biological specimen 12 is placed on the slide 14 as a thin cytological layer. Preferably, a cover slip (not shown) is adhered to the specimen 12, thereby fixing the specimen 12 in position on the slide 14. The specimen 12 may be stained with any suitable stain, such as a Papanicolaou stain, e.g., a ThinPrep® stain available from Cytyc Corporation, 250 Campus Drive, Marlborough, Mass. 01752.

With reference to FIG. 1, the system 10 generally comprises (1) an imaging station 18 for obtaining images of the biological material contained on the slide 14 and generating electronic image data from the images; (2) a server 20 or other computer (e.g., PC or the like) for filtering and processing the image data to identify regions of interest; and (3) one or more optional reviewing stations 22 (three are shown in FIG. 1), each of which provides a field of view that is scanned relative to each region of interest in order to present the regions of interest within the field of interest for viewing by a cytotechnologist or other skilled practitioner. The system 10 may also comprise a user interface (not shown), including a monitor, keyboard, and mouse (all not shown), so that the cytotechnologist can interact with the system 10.

The imaging station 18 is configured to image the slide 14, which is typically contained within a cassette (not shown) along with other slides. During the imaging process, the slides 14 are removed from the respective cassettes, imaged, and then returned to the cassettes in a serial fashion. The imaging station 18 may be capable of processing a number of cassettes, each holding up to around 25 slides.

The imaging station 18 generally comprises a camera 24, a microscope 26, and a motorized stage 28. The camera 24 captures magnified image frames of the slide 14 through the microscope 26. The camera 24 may be any one of a variety of conventional cameras, such as a charge coupled device (CCD) camera, which alone or in conjunction with other components, such as an analog-to-digital (A/D) converter, can produce a digital output of sufficient resolution to allow processing of the captured images, for example a digital image having a resolution of 640×480 pixels. Preferably, each pixel is converted into an eight-bit value (0 to 255) depending on its optical transmittance, with "00000000" being the assigned value for least amount of light passing through the pixel, and "11111111" being the assigned value for a greatest amount of light passing through the pixel. For example, a "0" represents the darkest pixel intensity while a "255" represents the lightest pixel intensity. While an eight-bit system has been described for assigning pixel intensities it should be understood that the methods described herein apply to other bit intensities (e.g., 16-bit, 32-bit, etc.).

The slide 14 is mounted on the motorized stage 28, which scans the slide 14 relative to the viewing region of the microscope 26, while the camera 24 captures images over various regions of the biological specimen 12. The shutter speed of the camera 24 is preferably relatively high, so that the scanning speed and/or number of images taken can be maximized. The motorized stage 28 keeps track of the x-y coordinates of the images as they are captured by the camera 24. For example, encoders (not shown) can be coupled to the respective motors of the motorized stage 28 in order to track the net distance traveled in the x- and y-directions during imaging. These coordinates are measured relative to the fiducial marks 16 affixed to the slide 14 (shown in FIG. 2). These fiducial marks 16 may be used by the reviewing station 22 to ensure that the x-y coordinates of the slide 14 during the review process can be correlated to the x-y coordinates of the slide 14 obtained during the imaging process.

Figure 3:
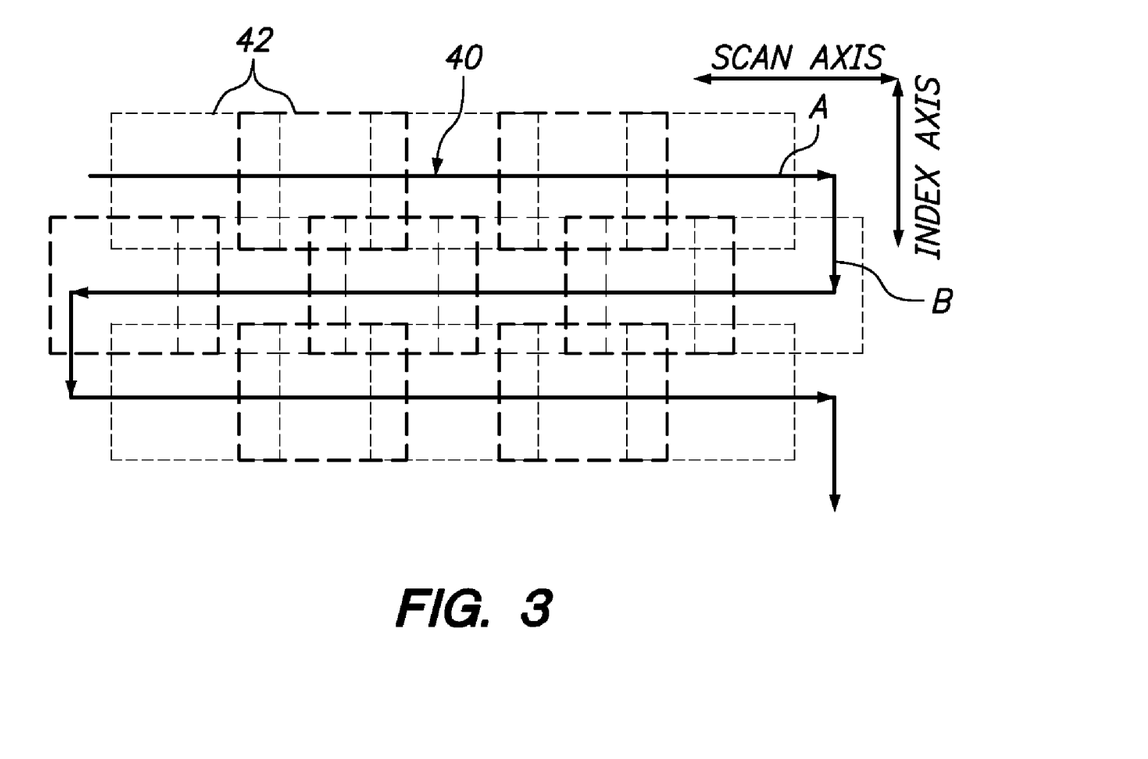
FIG. 3 illustrates the pattern of movement of a plurality of frames taken of a slide during an imaging operation. The movement includes movement along a scan axis as well as intermittent movements in the perpendicular direction along an index direction.

As illustrated in FIG. 3, the slide 14 is imaged in a zig-zag pattern 40, i.e., the slide 14 is scanned along the scan axis (horizontally—labeled as "A") to create a first row of image frames 42, offset along an index axis (vertically—labeled as "B"), scanned along the scan axis (horizontally) again to create a second row of image frames 42, and so on. To ensure that every portion of the biological specimen is scanned, and to compensate for mechanical scanning errors, an overlapping factor may be built into the image data frames.

Among other processing components not pertinent to an understanding of the present invention, the server (or other computer) 20 may comprise an image processor 30 that is configured to identify, locate, and rank the regions of interest within the image data frames 42 acquired from the camera 24. The server 20 may also include a memory 32, possibly in the form of a volatile memory, such as random access memory (RAM), for storing image data frames 42, region of interest information, and any other temporary information from the image processor 30. The server 20 may also include a routing processor 34 which is configured to map the routing path that the reviewing station 22 will use to scan from one region of interest to the next. The server 20 may also include a memory 36, for example, in the form of non-volatile memory, such as a hard disk drive or digital disk drive, configured for storing the location, ranking, and routing path of the regions of interest. It should be appreciated that the functions performed by the respective processors 30 and 34 can be performed by a single processor, or alternatively, performed by more than two processors. For example, the various functions may be integrated into an application-specific-integrated circuit (ASIC) or the like. Likewise, it can be appreciated that the memories 32 and 36 can be divided into several memories.

Referring back to FIG. 1, in one preferred embodiment, a plurality of optional reviewing stations 20 are shown coupled to the server 20, so that several cytotechnologists or other trained professionals have simultaneous access to the pertinent information stored in the server 20. Of course, as discussed herein, the system 10 may automatically perform one or more tasks that are typically performed by the cytotechnologist or other user. For example, in one aspect of the invention, the system 10 identifies the edges of various organelles and other cell structures of interest located within the cytological image data and uses this information for image segmentation. The system 10 may then automatically flag or identify regions of interest which may then be automatically analyzed to determine the presence or absence of diseased cells within the sample.

Figure 4:
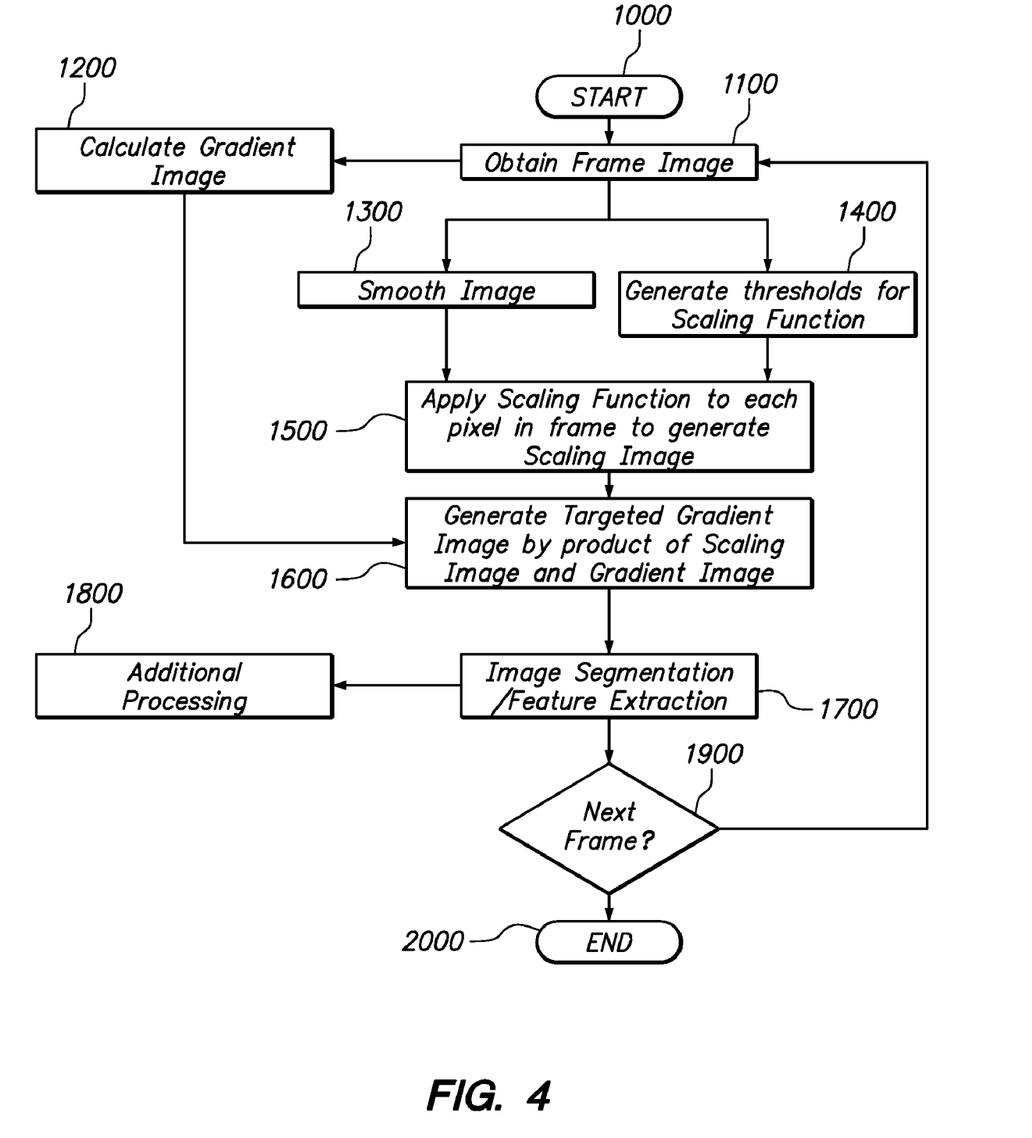
FIG. 4 illustrates a flow chart of a method of identifying target edges contained in cytological image data according to one embodiment.
Figure 5A:
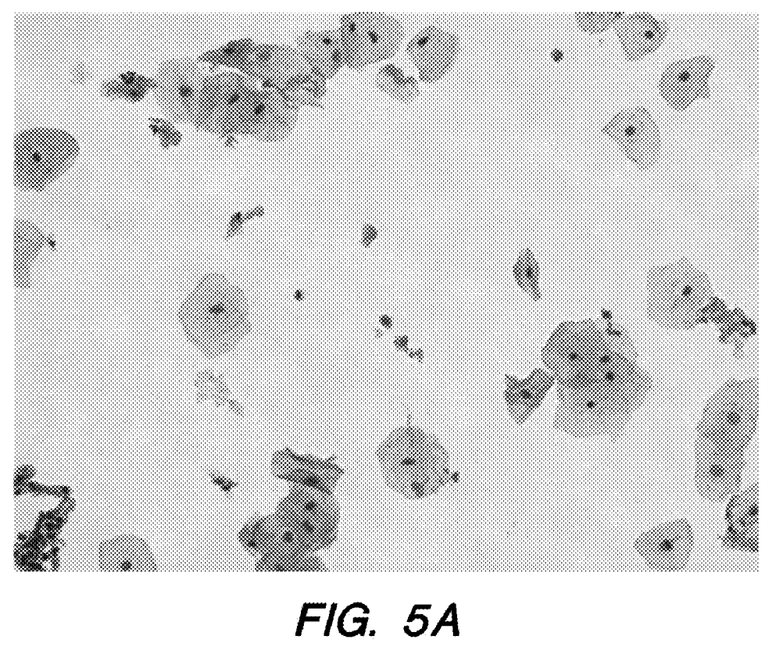
FIG. 5A illustrates an intensity image of a cytological specimen.
Figure 5B:
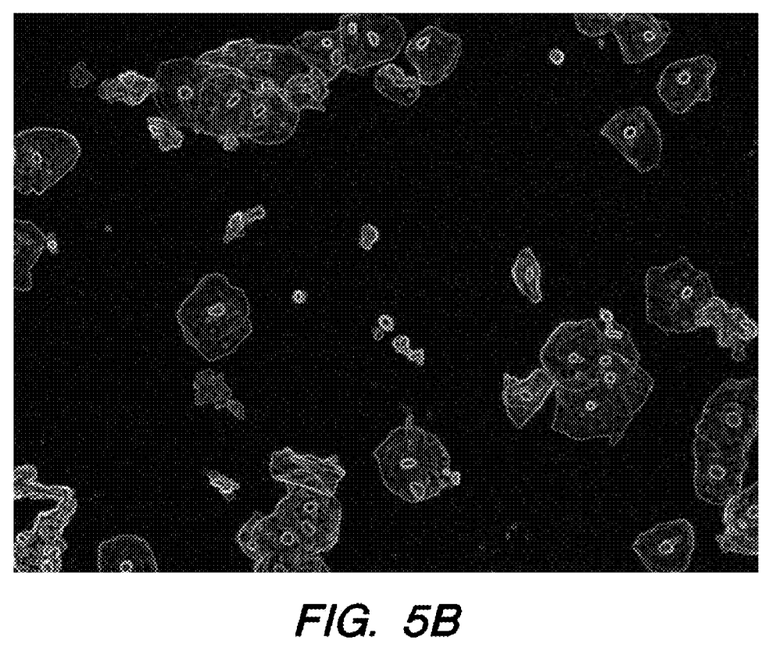
FIG. 5B illustrates a Gradient Image of the cytological specimen of FIG. 5A using the Sobel gradient.

FIG. 4 illustrates a method of identifying edges or borders contained in cytological image data according to one embodiment. In this method, which starts at 1000, an image of a frame 42 is first obtained as illustrated in operation 1100. Each frame 42 comprises an array of pixels with each pixel being converted into an eight-bit value (0 to 255) depending on its optical transmittance. An intensity-based image of the cytological sample is seen in FIG. 5A. A Gradient Image 50 of the frame 42 is then calculated as illustrated in operation 1200. The Gradient Image 50 of the frame 42 may be obtained by applying, at each pixel, a transformation which transforms grayscale intensity image data into edge strength image data. For example, the Gradient Image 50 may be generated using the Sobel gradient which is a linear transformation which transforms a grayscale intensity image into an edge strength image. The Sobel gradient utilizes the Sobel operator which is a discrete differentiation operator, computing an approximation of the gradient of the image intensity function. At each point or pixel in the image, the result of the Sobel operator is either the corresponding gradient vector or the norm of this vector. The Sobel operator calculates the gradient of the image intensity at each point, giving the direction of the largest possible increase from light to dark and the rate of change in that direction. The Sobel gradient is able to generate edge strength images because the gradient is able to determine how abruptly or smoothly the image changes at a particular location within the frame 42, and therefore how likely it is that that part of the image represents an edge or border, as well as how that edge is likely to be oriented. Details regarding the Sobel gradient operation may be found in Anil K. Jain, "Fundamentals of Digital Image Processing", pp. 348-349, Prentice Hall, Information and System Sciences Series, which is incorporate by reference as if set forth fully herein. FIG. 5B illustrates a Gradient Image 50 of a cytological specimen (intensity image of FIG. 5A) using the Sobel gradient.

Still referring to FIG. 4, the image frame 42 is then subject to an optional smoothing operation 1300 to remove high frequency noise. The smoothing operation 1300 is essentially a digital filter that is able to remove spurious high frequency noise and produces better results. The smoothing operation 1300 may be performed using known smoothing methods employed in the imaging arts. For example, the image frame 42 may be smoothed using a 3×3 Gaussian smoothing kernel.

Next, as seen in operation 1400, one or more thresholds for a Scaling Function are established. In one aspect of the invention, the thresholds may include a range of intensity values (e.g., values ranging from 0 to 255). In one aspect, the thresholds are preset or predetermined. For example, empirical studies may show that an edge of one region of interest is typically found within the intensity range of 70-100. In this example, the two endpoints of the range (70 and 100) may be used as pre-established thresholds. In this example, the same thresholds are used for multiple, different frames 42. Of course, as explained below, in other embodiments, these threshold values are dynamically generated on a frame-by-frame basis.

In another embodiment, histographic clustering of intensity values within a particular frame 42 may be used to establish threshold values on a frame-by-frame basis. That is to say, threshold values are updated as the case may be for each new image frame 42. In one example, k-means clustering is used to dynamically choose a pair of thresholds which will be used to define a piecewise linear transformation (explained in detail below) which is applied to the intensity image to produce a Scaling Image 60. K-means clustering is an iterative segmentation algorithm which generates multiple class means from a grayscale intensity image histogram.

Figure 6A:
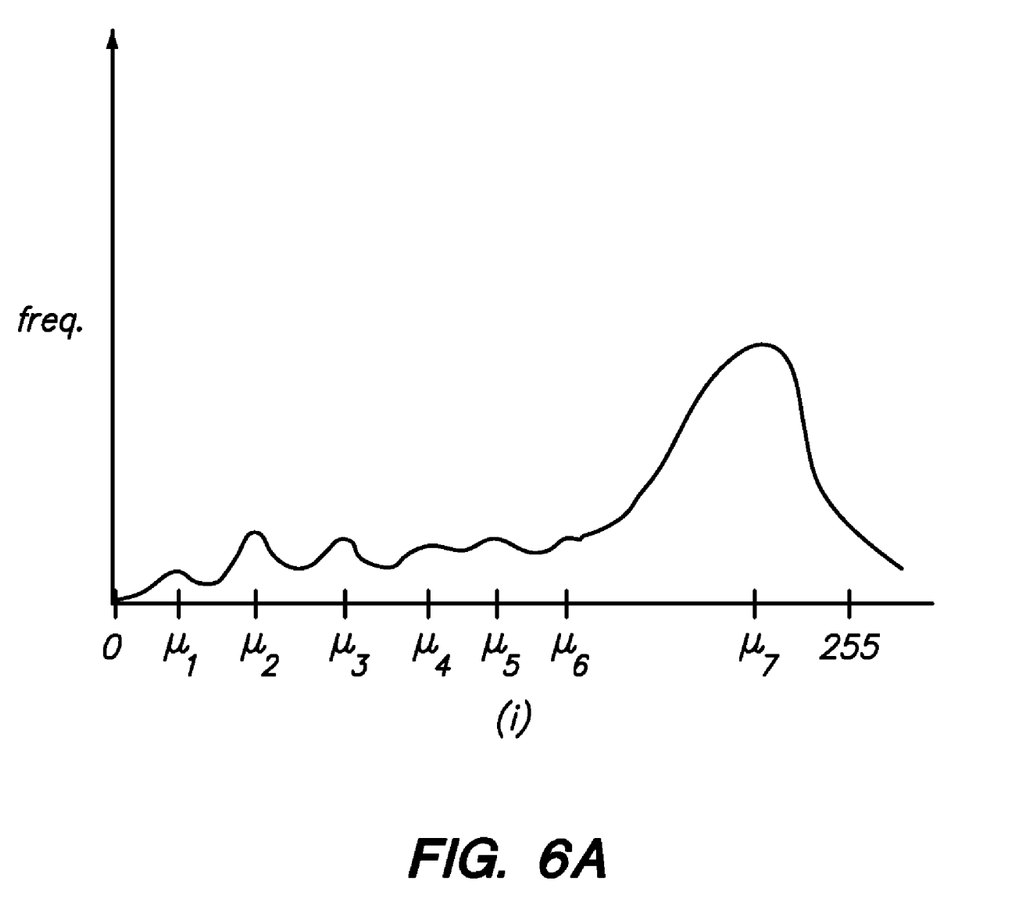
FIG. 6A illustrates an exemplary histogram of the grayscale intensity values of an individual image frame of a slide containing a cytological specimen.

FIG. 6A illustrates an exemplary histogram of the grayscale intensity values 42 of an individual image frame 42. K-means clustering is an iterative mathematical algorithm that generates a series of class means through clustering pixel intensities into a number of different classes based upon the minimization of the intra-class variance. Empirical results indicate that k=7 classes provided useful clusterings of pixels and identification of class means for cytological image data. As seen in FIG. 6A the distribution of intensity values results in seven class means ($\mu_1$, $\mu_2$, $\mu_3$, $\mu_4$, $\mu_5$, $\mu_6$, $\mu_7$). Two of these class means may be used as threshold values according to one aspect of the invention. Moreover, these threshold values may be continually updated or refreshed on a frame-by-frame basis as the distribution of pixels changes with different image frames 42. This allows for an adaptive behavior of the algorithm in terms of finding nucleus edges in slide preparations which come from a wide variation in the stain.

Generally speaking, the class means provides information about which intensity ranges within the intensity image correspond to a particular set of cellular material. For instance one class mean may correspond to nucleus while another class means corresponds to the cytoplasm, or to the background region. In one particular method which produces good results for vaginal tissue preparations, seven such classes (k=7) are used. When seven (7) means are used, and thresholds are formed as the midpoints between the class-means, $Thresh_i=(\mu_i+\mu_{i+1})/2$, it has been found that the third and fourth threshold values ($Thresh_3$, $Thresh_4$) produce particularly good results when used in definition of the Scaling Function. Of course, it should be understood that the method described herein is not limited to seven such class means nor the use of the third and fourth class means of the set of seven. Rather, more or less class means may be used and still fall within the scope of the invention, and an arbitrary definition of Scaling Function which makes use of any K-Means data to suppress and pass various intensity ranges also falls within the scope of the invention.

The following description is an illustrative pseudo-code used to generate class means given a particular number of clusters (i.e., class means). Initially, an image frame 42 is provided. This image (img) and the number of clusters or class means (k) is input. A gray level histogram of img is then computed (imPDF). Next, an array of class means ($\mu$) is initialized to be evenly spaced throughout imPDF according to steps (1) and (2) below:

From imPDF, compute valMin and valMax, the minimum and maximum pixel values in the image frame. (1)

For each of the class means $\mu(j)$ where $j \in [1, k]$, (2)

$$\mu(j) = \frac{(j*(valMax - valMin + 1))}{k+1}$$

Next, the following iterative process is conducted to recalculate the class means. The process is stopped when the largest difference between class-means at successive iterations is <eps (floating point round off error):

For each non-zero bin in the histogram, compute the distance of this bin to each of the k class means $\mu$, and determine which class mean it is closest to: binClass; along with the distance to the class mean: binMinDist. (3)

Recalculate class means: For each class mean µ(j) where j∈[1, k], (4)
Compute pdfSum, the total number of pixels in this class.

$$pdfSum(j) = \sum_{i \in class(j)} imPDF(i) \quad (4.1)$$

Set the new class mean to be the center of mass of the bins of class j:

$$\mu(j) = \frac{\sum_{i \in class(j)} i \cdot imPDF(i)}{pdfSum(j)} \quad (4.2)$$

Compute the BCS (between class scatter) score for this iteration: (5)
Compute image mean imMu from histogram. (5.1)
Compute BCS score:

$$BCS = \sum_{j=1}^{k} pdfSum \cdot (imMu - \mu(j))^2 \quad (5.2)$$

The final set of class means returned is selected as the means computed on the iteration which maximized the BCS score. Each class mean returned is represented by a number corresponding to an intensity value (e.g., between 0 and 255). The thresholds for the scaling function are then selected from the set of class means that is returned by the above-noted k-means clustering algorithm. For instance, for k=7 the thresholds formed from the third and fourth class means (Thresh$_3$, Thresh$_4$) may be used as the thresholds for the scaling function. In some embodiments, only a single threshold level is established in which case a single class mean is selected.

It should also be understood, that in one aspect of the invention, the threshold(s) are dynamically generated for each image frame 42. In this aspect, the above-noted k-means algorithm is performed on each image frame 42 to extract the class means of interest. These class means may shift slightly for each frame image 42 and the threshold level(s) may be dynamically generated to optimize edge detection.

Figure 7:
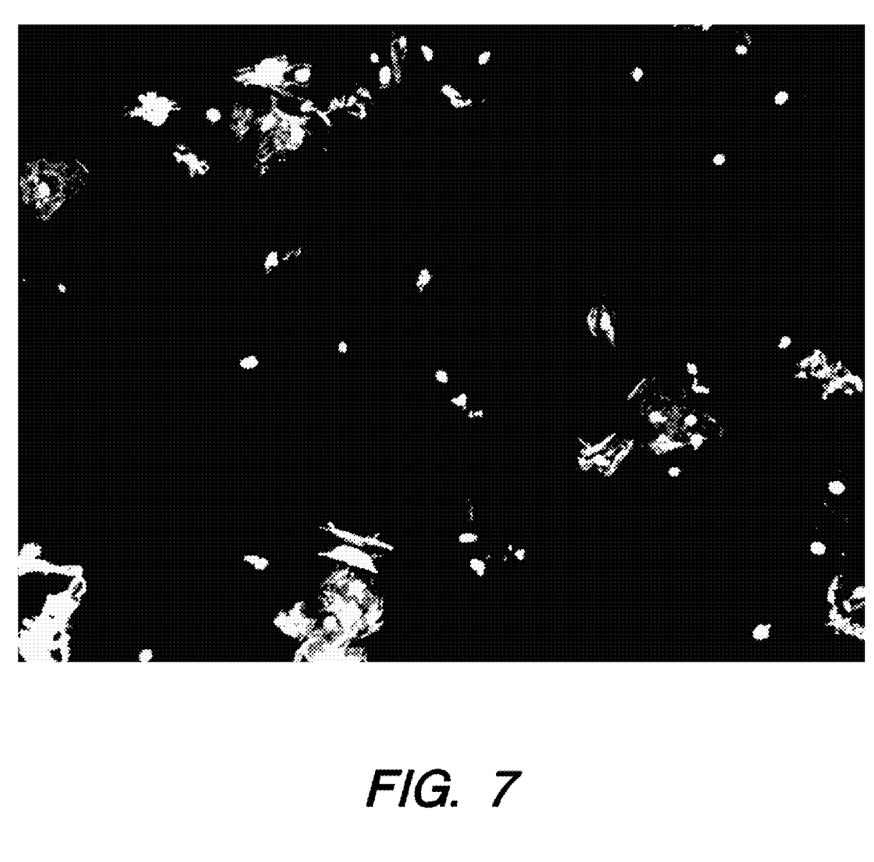
FIG. 7 illustrates an example of a Scaling Image produced in accordance with the methods described herein.

Still referring to FIG. 4, in operation 1500, a Scaling Function is applied to each pixel in the image frame 42 to generate a Scaling Image 60. An example of a Scaling Image is illustrated in FIG. 7. The Scaling Function transforms image intensity values into scaled values. The nature and/or extent of the scaling depends on the particular image intensity. For example, a first range of image intensities may be suppressed while a second range of image intensities are retained. For example, the first range of image intensities that are to be suppressed may correspond generally to image intensities associated with pixels that do not correspond to cellular nuclei. Conversely, the second range of image intensities that are retained may correspond to the image intensities associated with pixels that do correspond to cellular nuclei. For segmentation applications that require knowledge of the location of the edge of cellular nuclei, this method effectively suppresses those pixels that are generally known not to correlate to nuclei.

Figure 6B:
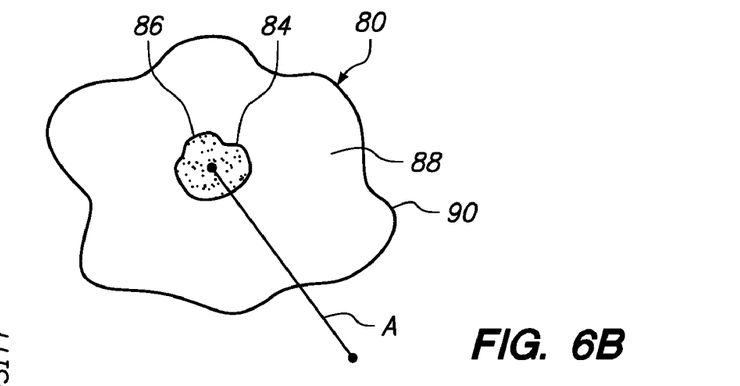
FIG. 6B illustrates a cell having a nucleus and cytoplasm. Line A is shown radiating outward from the nucleus beyond the exterior edge of the cell.
Figure 6C:
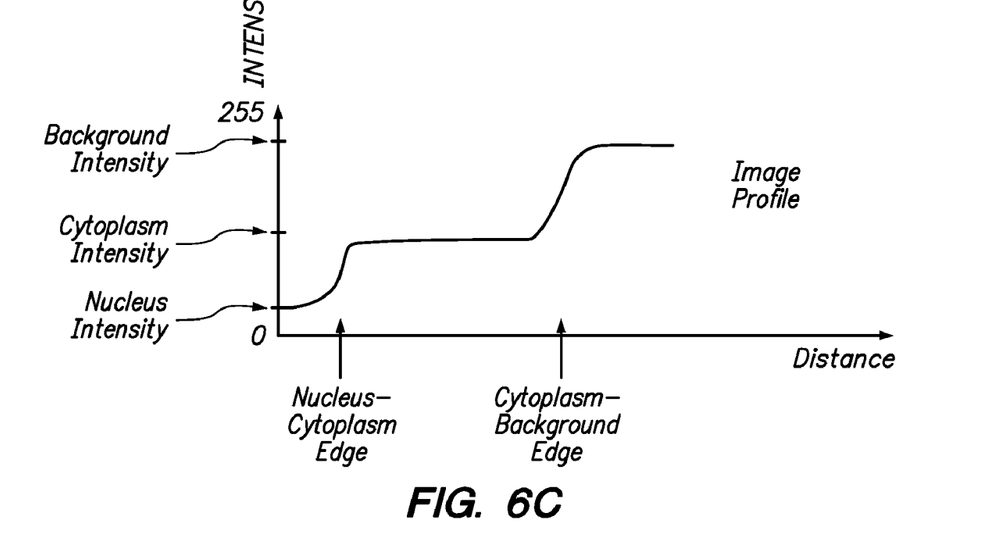
FIG. 6C illustrates a profile of the image intensity as a function of distance along the line A in FIG. 6B.
Figure 6D:
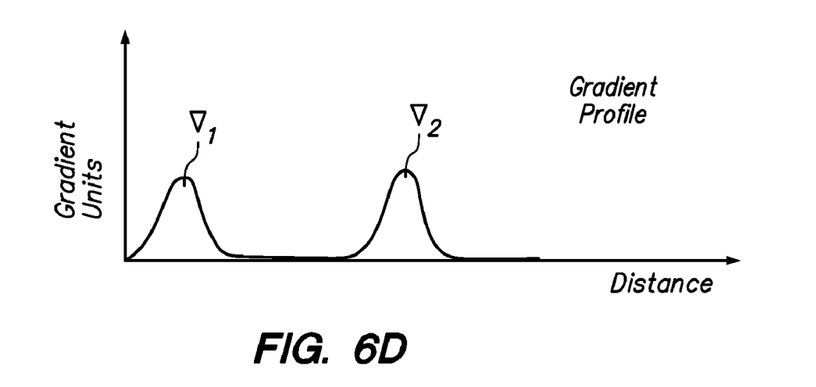
FIG. 6D illustrates a profile of the gradient as a function of distance along the line A in FIG. 6B.

Further, there may exist a third range of image intensities that represents a region of uncertainty. For example, in this third range, the pixels may be "in-between" and correspond to the locations where there likely is a transition from the cell nuclei to the cell cytoplasm. In this third range, which may be between two established threshold values, a linear transformation may be applied to the image intensities. FIG. 6B illustrates a cell 80 having a nucleus 84 and a cytoplasm 88 along with a line A radiating outward from the nucleus 84. The nucleus 84 includes an edge 86 and the cytoplasm 88 includes an edge 90. FIG. 6C illustrates a profile of the image intensity of the cell 80 as a function of distance along the line A in FIG. 6B. As seen in FIG. 6B, the intensity starts out at an initial low (e.g., dark) level that represents the intensity of pixels typically encountered in the nucleus 84. As one moves radially outward along the line A, the intensity begins to rapidly increase. This first increase in intensity corresponds to the changing intensities occurring at the nuclear edge 86. FIG. 6D illustrates a profile of the gradient as a function of distance along the line A in FIG. 6B. As seen in FIG. 6D, the first response $\nabla_1$ in the gradient profile corresponds to the transition made across the nuclear edge 86. Similarly, the second response $\nabla_2$ in the gradient profile corresponds to the transition made across the cytoplasm edge 90.

One illustrative Scaling Function (SF) is disclosed below that relies on first and second threshold values ($T_1$ and $T_2$) obtained from the k-means histogram algorithm discussed above. In this embodiment, the first threshold value ($T_1$) corresponds to the threshold derived from the third of seven class means (Thresh$_3$) while the second threshold value ($T_2$) corresponds to the fourth of seven class means (Thresh$_4$). The nature and extent of the scaling depends on whether the image intensity (i) is below the first threshold (i<$T_1$), between the first and second thresholds ($T_1 \leq i \leq T_2$), or greater than the second threshold (i>$T_2$). The Scaling Function (SF) for each of these three regions according to one embodiment is disclosed below:

$$SF(i)=1.0 \text{ for } i\epsilon[0,T_1], \quad (6)$$

$$SF(i)=1-(i-T_1)/(T_2-T_1) \text{ for } i\epsilon(T_1,T_2], \quad (7)$$

$$SF(i)=0.0 \text{ for } i\epsilon(T_2,255]. \quad (8)$$

Figure 6E:
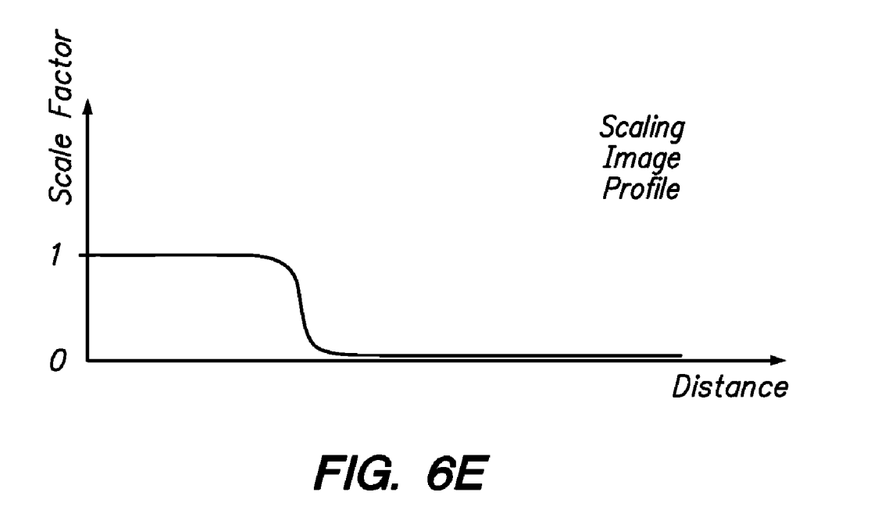
FIG. 6E illustrates a Scaling Image profile for the cell of FIG. 6B in which the region of the nucleus and nucleus edge is retained while the region of cytoplasm and its respective edge is suppressed.
Figure 8:
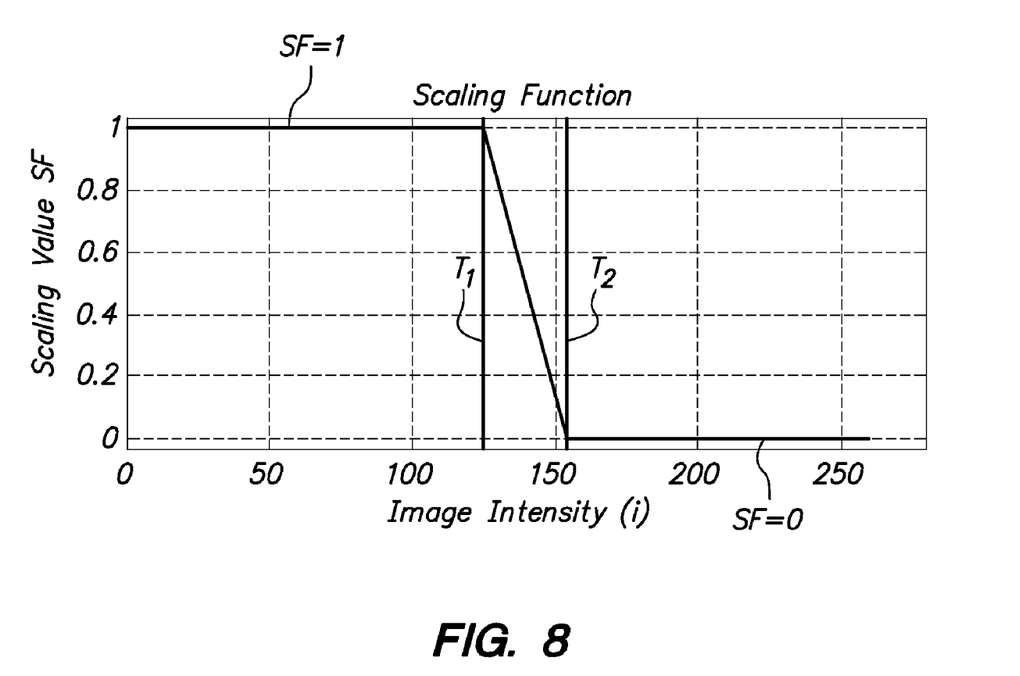
FIG. 8 illustrates a graph of the scaling value as a function of image intensity (i) for a scaling function intended to identify nucleus edges (suppressing cytoplasm edges).

As seen in the Scaling Functions (SF) above, for intensities that are between 0 and $T_1$, the scaling factor is one (1.0), thus retaining the same image intensity (i). The Scaling Function (SF) for this range of intensities may correspond, for example, to the pixels where the nucleus 84 is likely to be found. For intensities that are between $T_1$ and $T_2$, however, a linear scaling function is used to scale the image intensities (i) between the two endpoints in a substantially linear fashion. This range corresponds to the uncertain region where the edge 86 between the cell nucleus 84 and the cytoplasm 88 is likely to be found. For intensities that are above $T_2$ (i.e., above $T_2$ and up to 255), a scaling factor of zero (0.0) is applied. In this regard, the image intensities are suppressed or eliminated where neither the nucleus 84 nor the nucleus edge 86 are likely located. FIG. 8 illustrates a graph of the image intensity (i) as a function of scaling value using the algorithm disclosed above. Reference is also made to FIG. 6E which illustrates a Scaling Image profile for the cell 80 of FIG. 6B in which the image of the nucleus 84 and nucleus edge 86 is retained while the cytoplasm 88 and its respective edge 90 are suppressed. The above-noted Scaling Function is advantageous when the segmentation or feature extraction process requires the position of the edge or border of the nucleus 84.

A modified Scaling Function (SF) may be used when the segmentation or feature extraction mode requires the edge or border 90 between the cytoplasm 88 and the background. This alternative Scaling Function (SF) is set forth below.

$$SF(i)=0.0 \text{ for } i\epsilon[0,T3], \quad (9)$$

$$SF(i)=(i-T_3)/(T_4-T_3) \text{ for } i\epsilon(T_3,T_4], \quad (10)$$

$$SF(i)=1.0 \text{ for } i\epsilon(T_4,255]. \quad (11)$$

Figure 9:
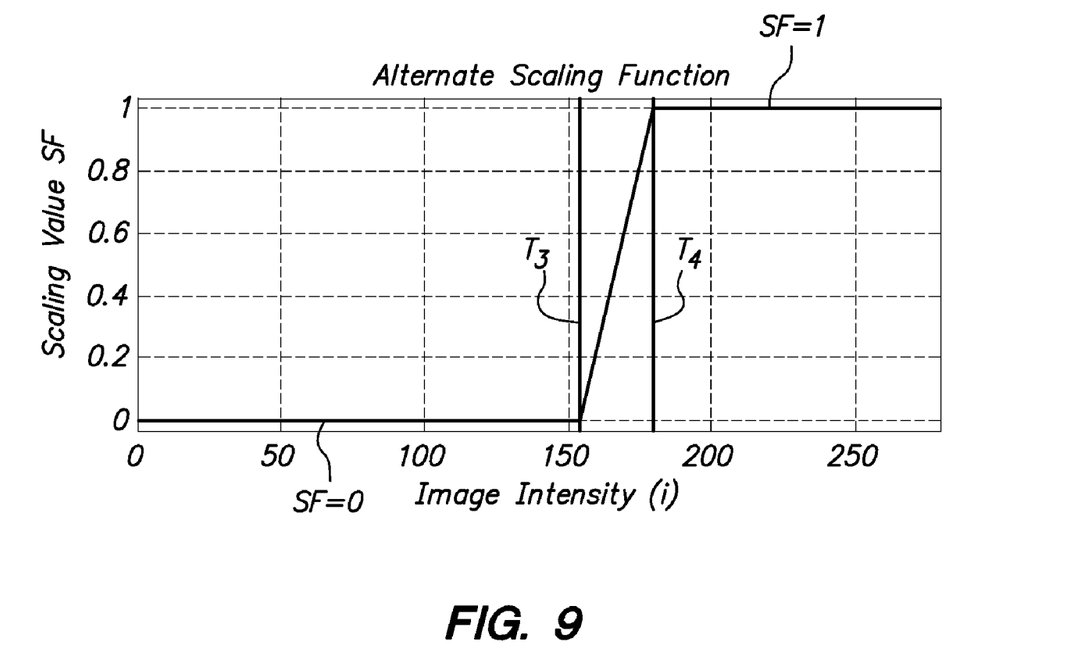
FIG. 9 illustrates a graph of the scaling value as a function of image intensity (i) for a scaling function intended to identify cytoplasm edges (suppressing nucleus edges).

First, in this alternative Scaling Function (SF), different thresholds are chosen ($T_3$, $T_4$) based on their ability to discriminate the edge 90 between the cytoplasm 88 and the background. In one embodiment of this algorithm, the thresholds T3 and T4 are taken to be the thresholds $Thresh_4$ and $Thresh_5$ as derived from the class means in the k-Means analysis. As seen in the alternative Scaling Functions (SF) set forth above, for intensities that are between 0 and $T_3$, the scaling factor is zero (0.0), thus suppressing image intensity (i). In this regard, the image intensities are suppressed or eliminated where there is little or no likelihood of having cytoplasm edges 90 present. For intensities that are between $T_3$ and $T_4$, however, a linear scaling function is used to scale the image intensities (i) between the two endpoints in a substantially linear fashion. This range corresponds to the uncertain region where the edge 90 between the cytoplasm 88 and the background is likely to be found. For intensities that are above $T_4$ (i.e., above $T_4$ and up to 255), a scaling factor of one (1.0) is applied. This may correspond to, for example, background. FIG. 9 illustrates a graph of the image intensity (i) as a function of scaling value using the alternative algorithm disclosed above. The above-noted Scaling Function is advantageous when the segmentation or feature extraction process requires the position of the edge or border 90 of the cytoplasm/background.

Referring back to FIG. 4, in operation 1600 a Targeted Gradient Image 70 is generated from the Scaling Image 60 and the Gradient Image 50. In particular, the Targeted Gradient Image 70 is generated by the product of the Scaling Image 60 and the Gradient Image 50. The Targeted Gradient Image 70 may be represented by the following where TG corresponds to the Targeted Gradient at pixel (x,y) in the image frame 42:

$$\text{For each pixel } (x,y) \text{ in the image: } TG_{x,y}=SF(I_{x,y})\times \text{SobelGradient}_{x,y} \quad (12)$$

Figure 6F:
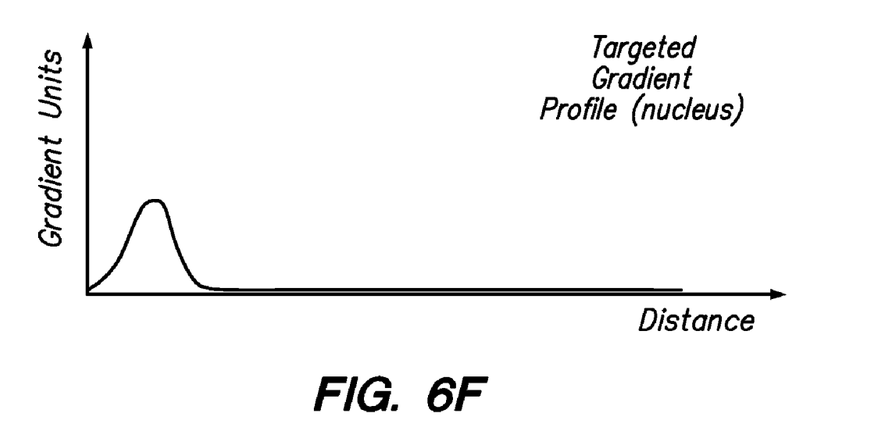
FIG. 6F illustrates a Targeted Gradient profile for a Scaling Function designed to return or pass the cell nucleus and its respective edge (but not the cytoplasm or its respective edge) that has been applied to the single cell illustrated in FIG. 6B.
Figure 6G:
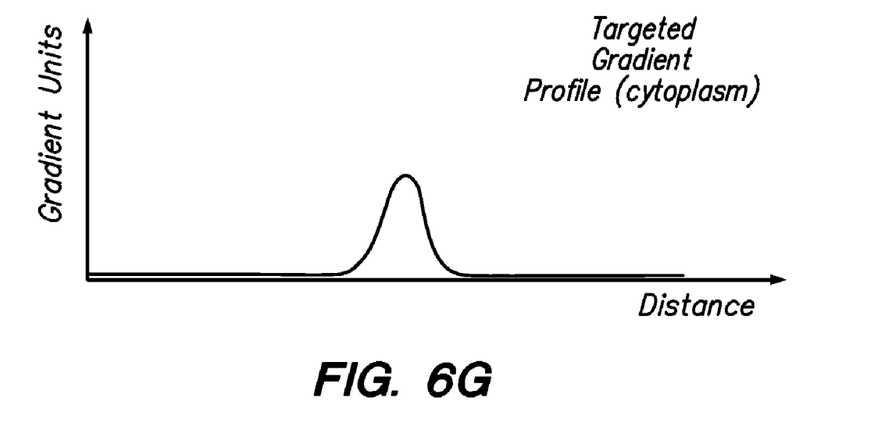
FIG. 6G illustrates a modified Targeted Gradient profile for a Scaling Function designed to return or pass the cell cytoplasm and its respective edge (but not the nucleus or its respective edge) that has been applied to the single cell illustrated in FIG. 6B.
Figure 10:
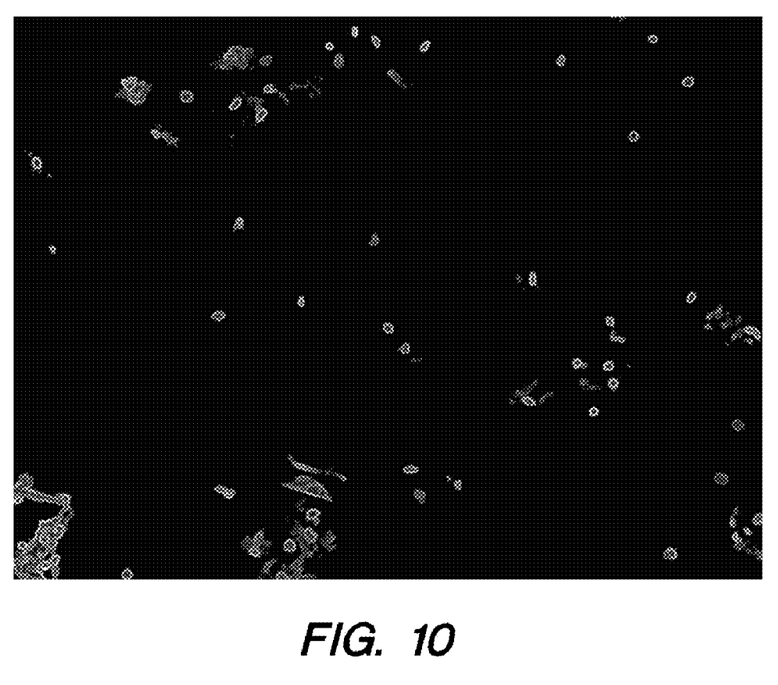
FIG. 10 illustrates a Targeted Gradient Image that was generated using a Scaling Function (SF) of the type illustrated in FIG. 8.
Figure 11:
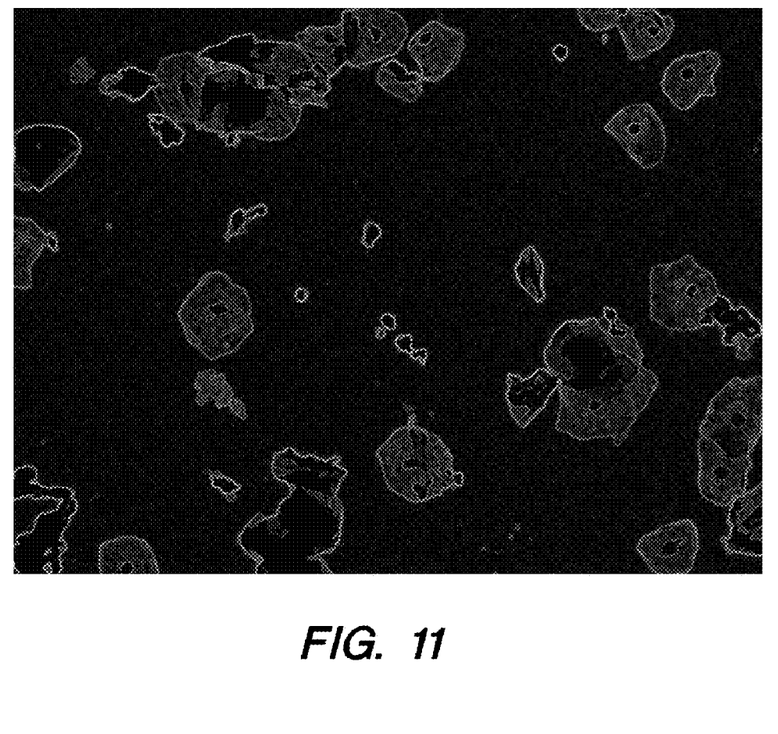
FIG. 11 illustrates a Targeted Gradient Image that was generated using a Scaling Function (SF) of the type illustrated in FIG. 9.

FIGS. 10 and 11 illustrate exemplary Targeted Gradient Images 70. In FIG. 10 a Targeted Gradient Image 70 is illustrated that was generated using a Scaling Function (SF) of the type illustrated in FIG. 8. In this regard, the edges of the cell nuclei are highlighted (illustrated as light-colored borders or edges) with most of the edges between the cytoplasm/background being suppressed. For illustration purposes, FIG. 6F illustrates a Targeted Gradient profile for a similar Scaling Function applied to a single cell 80 illustrated in FIG. 6B. As seen in FIG. 6F, the gradient profile of the nucleus 84 and its edge 86 is retained while the gradient profile of the cytoplasm 88 and its edge 90 are suppressed. FIG. 11 illustrates a Targeted Gradient Image 70 that was generated using a modified Scaling Function (SF) of the type illustrated in FIG. 9. As can be seen in FIG. 11, the edges or borders between the cytoplasm and the background are highlighted (illustrated as light-colored borders or edges) with most of the edges of the cell nuclei being suppressed. FIG. 6G illustrates a Targeted Gradient profile for a similar Scaling Function applied to a single cell 80 illustrated in FIG. 6B. As seen in FIG. 6G, the gradient profile of the nucleus 84 and its edge 86 is suppressed while the gradient profile of the cytoplasm 88 and its edge 90 are retained.

Figure 12A:
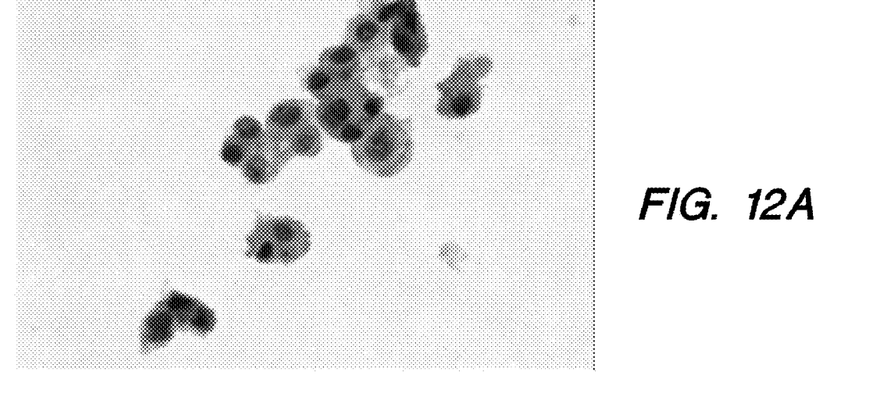
FIG. 12A illustrates an original image of a cytological specimen as captured by a camera of an imaging station.
Figure 12B:
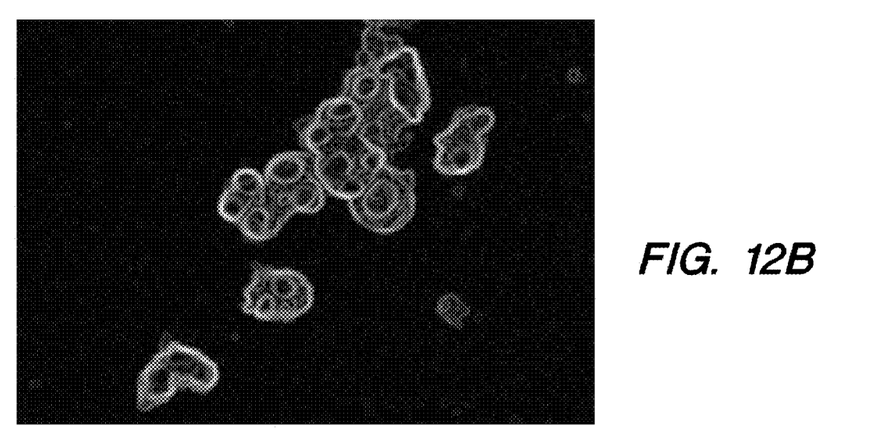
FIG. 12B illustrates the Gradient Image of the same cytological specimen shown in FIG. 12A.
Figure 12C:
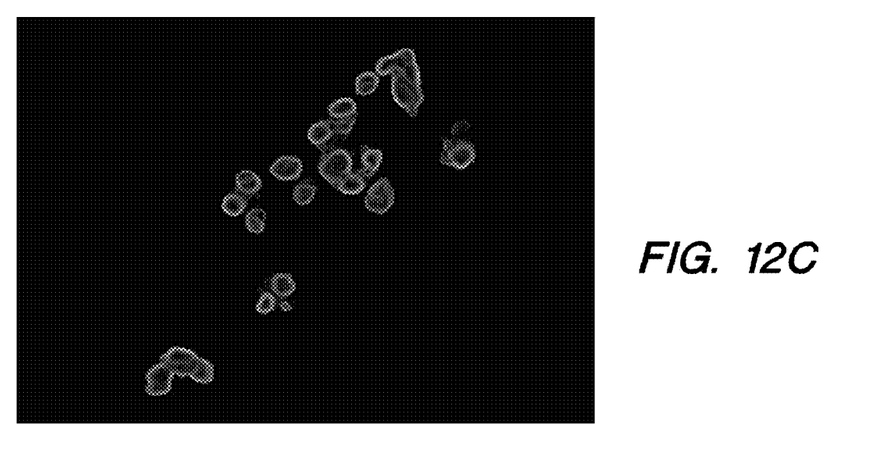
FIG. 12C illustrates the Targeted Gradient Image (as generated using a scaling function as defined in FIG. 8) after combing the product of the Scaling Image and the Gradient Image.

FIGS. 12A-12C illustrate a panel of images of a cytological specimen 12. FIG. 12A illustrates an original image of the cytological specimen 12 as captured, for example, from the camera 24 of the imaging station 18 described herein. As seen in FIG. 12, individual cells are seen with nuclei contained therein. The nuclei are seen as relatively dark circular-like structures. The cytoplasm surrounding the nucleus and contained within the cellular wall is also seen but is much lighter than the nuclei. FIG. 12B illustrates the Gradient Image 50 of the same cytological specimen 12 in FIG. 12A. The Gradient Image 50 may include, for example, a Gradient Image 50 obtained using the Sobel gradient. As seen in FIG. 12B, the outlines or edges of both the cell nuclei and the cell borders appear in the Gradient Image 50. In the Gradient Image 50, the edge between the cytoplasm and the background somewhat dominates (e.g., is brighter in FIG. 12B) as compared with the edge of the nuclei. FIG. 12C illustrates the Targeted Gradient Image 70 produced in accordance with the methods described herein. As seen in FIG. 12C, the edges of the nuclei are highlighted (by the light-colored border or edges) while the edges between the cytoplasm and the background are suppressed to a significant degree. FIG. 12C thus visually illustrates the ability of the method to identify the edges of selected cellular organelles or structures—in this case the edge of nuclei. Of course, as explained herein, the methods may be used to identify the edges of other cellular structures such as the cell walls or borders.

As seen in FIG. 4, once the Targeted Gradient Image 70 has been generated, image segmentation and/or feature extraction may be performed. This may require additional image processing as illustrated in operation 1800. After image segmentation and/or feature extraction has been performed on the image frame 42, the method moves to the next image frame 42 for image acquisition (operation 1900). In this regard, the thresholds for the Scaling Function may be updated as needed. The process continues until there are no additional frames in which case the process ends (operation 2000).

In one alternative aspect of the invention, a single threshold value is used to suppress cytoplasm edges. In this embodiment, after the k-means analysis is performed (but before application of the Gradient Image) to present multiple class means, a single class means is chosen as the threshold value. For example, the third class means ($\mu_3$) of a set of seven total (k=7) may be chosen as the threshold value. Those intensities that in the image that are greater than $\mu_3$ are set to $\mu_3$. This diminishes the strength of the cytoplasm/background edges in the gradient image, resulting in a slightly cleaner Targeted Gradient Image 70. This also eliminates the need for the Scaling Image 60 because all edges caused by intensities greater than $\mu_3$ are effectively removed.

It should be understood that the method of identifying edges in cytological image data may be incorporated into software or other computer-readable instructions incorporated into the imaging station 18. For example, one or more processors may be configured to perform image smoothing, calculate Gradient Images 50, generate thresholds for the Scaling Function (SF), generate the Scaling Image 60, and generate the Targeted Gradient Image 70. The processor(s) may include one or more dedicated processors that are substantially dedicated to image processing operations. For example, this may include image processor 30 illustrated in FIG. 1. The image processor 30 may be configured to generate, either statically or dynamically, the threshold(s) used for the various Scaling Functions employed used to isolate and identify the edges or borders of various cellular organelles. The image processor 30 may be operatively coupled to the camera 24 of the imaging station 18 to receive the imaging frames 42 as they are generated.

While embodiments of the present invention have been shown and described, various modifications may be made without departing from the scope of the present invention. The invention, therefore, should not be limited, except to the following claims, and their equivalents.

What is claimed is:

1. A method of identifying edges of cellular structures contained in cytological image data comprising:
   obtaining an intensity image of a specimen;
   computing a gradient image from the obtained intensity image;
   smoothing the intensity image to form a smoothed intensity image;
   applying a scaling function to the smoothed intensity image to generate a scaling image identifying regions of interest; and
   forming the product of the scaling image and gradient image so as to identify edges of the cellular structures of interest.

2. The method of claim 1, wherein the scaling function is updated for each frame of the digital image.

3. The method of claim 1, wherein the scaling function transforms image intensity into scaled values, wherein one or more ranges of image intensities are suppressed and one or more ranges of image intensities are retained.

4. The method of claim 3, wherein one or more ranges of image intensities are scaled in a substantially linear fashion.

5. The method of claim 4, wherein the ranges of image intensities to be preserved, suppressed, and scaled are updated for each frame.

6. The method of claim 1, the operation of identifying edges of regions of interest from the computed gradient image comprises mapping a scaling image to a Sobel gradient image.

7. The method of claim 1, wherein the scaling function comprises identifying pixels having intensity values within one or more ranges.

8. The method of claim 7, wherein the range(s) defining the scaling function is determined by k-means clustering of the pixel intensity values, in which class means are used to determine the ranges in the scaling function.

9. The method of claim 7, wherein the range of pixels is preset.

10. A method of identifying target edges contained in cytological image data comprising:
    obtaining a digital image of a specimen, the digital image comprising a plurality of frames, each frame comprising pixels having varying intensity values;
    applying a scaling function to the pixels in each frame to obtain a scaled image, wherein scaling function comprises an operation of retaining pixel intensity, suppressing pixel intensity, or applying a substantially linear transformation of pixel intensity based at least in part on pixel intensity values obtained from the digital image; and
    mapping the scaled image to a gradient image of the digital image, wherein the mapped image identifies target edges contained in the cytological image data.

11. The method of claim 10, wherein the scaling function comprises establishing a range of pixel intensity values, wherein pixels having intensity values below the range are retained, pixels having intensity values above the range are suppressed, and pixels having intensity values within the range are scaled using the substantially linear transformation.

12. The method of claim 10, wherein the scaling function comprises establishing a range of pixel intensity values, wherein pixels having intensity values below the range are suppressed, pixels having intensity values above the range are retained, and pixels having intensity values within the range are scaled using the substantially linear transformation.

13. The method of claim 10, wherein the gradient image comprises a Sobel gradient image.

14. The method of claim 11, wherein the scaling function comprises determining the range using class means computed through k-means clustering of the pixel intensity values.

15. The method of claim 12, wherein the scaling function comprises determining the range using class means computed through k-means clustering of the pixel intensity values.

16. The method of claim 11, wherein the range of pixels is preset.

17. The method of claim 12, wherein the range of pixels is preset.

18. A system for generating cytological image data that identifies a target edge of a cellular feature contained therein, comprising:
    an imaging station configured to obtain an image of a cytological specimen, the image comprising a plurality of image frames; and
    one or more image processors configured to
    calculate a Gradient Image of an image frame,
    generate a Scaling Image of the image frame by application of a Scaling Function to each pixel in the frame, and
    generate a Targeted Gradient Image based at least in part on the Gradient Image and the Scaling Image, the Targeted Gradient Image comprising cytological image data including the target edge of the cellular feature.

19. The system of claim 18, wherein the edge of the cellular feature comprises the nucleus edge.

20. The system of claim 18, wherein the edge of the cellular feature comprises the cytoplasm edge.

* * * * *